United States Patent [19]

Sperger et al.

[11] Patent Number: 5,684,554
[45] Date of Patent: Nov. 4, 1997

[54] LIQUID CRYSTAL DISPLAY

[75] Inventors: Reinhard Sperger, Feldkirch; Ernst Luger, Feldkirch-Nofels, both of Austria

[73] Assignee: Balzers Aktiengesellschaft, Furstentum, Germany

[21] Appl. No.: 401,217

[22] Filed: Mar. 9, 1995

[30] Foreign Application Priority Data

Mar. 11, 1994 [DE] Germany .................. 44 08 155.3

[51] Int. Cl.$^6$ .................................. G02F 1/1335
[52] U.S. Cl. ...................... 349/113; 349/117; 349/119
[58] Field of Search .................... 359/73, 74, 79; 349/117, 119, 113, 122, 138

[56] References Cited

U.S. PATENT DOCUMENTS

| | | | |
|---|---|---|---|
| 3,736,047 | 5/1973 | Gelber et al. | 350/160 |
| 4,248,502 | 2/1981 | Bechteler et al. | 359/75 |
| 4,505,547 | 3/1985 | Sekimura | 359/74 |
| 4,521,079 | 6/1985 | Leenhouts et al. | 350/339 R |
| 4,529,272 | 7/1985 | Kruger et al. | 359/75 |
| 4,556,288 | 12/1985 | Sekimura | 359/82 |
| 4,715,686 | 12/1987 | Iwashita et al. | 359/74 |
| 5,148,298 | 9/1992 | Shigeta et al. | 359/74 |

FOREIGN PATENT DOCUMENTS

| | | |
|---|---|---|
| 0569922 | 11/1993 | European Pat. Off. |
| 5660479 | 10/1979 | Japan. |
| 56-54413 | 5/1981 | Japan. |
| 56-62224 | 5/1981 | Japan. |
| 58-75116 | 5/1983 | Japan. |
| 58-76812 | 5/1983 | Japan. |
| 58-76813 | 5/1983 | Japan. |
| 59-202435 | 11/1984 | Japan. |
| 2084343 | 4/1982 | United Kingdom. |

Primary Examiner—William L. Sikes
Assistant Examiner—Tiep H. Nguyen
Attorney, Agent, or Firm—Notaro & Michalos P.C.

[57] ABSTRACT

In order to drastically decrease, the differences of reflection as well as the differences of color in the region with a conductive electrode structure (5) facing the viewing environment (U) on a liquid crystal display, and a region without the structure corresponding to regions ($B_I$) and ($B_o$), the invention provides a compensation layer configuration (7) on at least one side of the electrode arrangement (5) facing the viewing environment (U). The configuration is laid out so that reflection differences of the regions become minimal as do the color differences of the regions caused by their spectral reflection profile.

26 Claims, 4 Drawing Sheets

LIQUID CRYSTAL DISPLAY

FIELD AND BACKGROUND OF THE INVENTION

The present invention relates to a liquid crystal display.

The following definitions are used in this disclosure:
Spectral range of visible light:
In the following the visible spectral range is expressed as being the wavelength λ, where:

$$380 \text{ nm} \leq \lambda \leq 770 \text{ nm}. \quad (1)$$

$R_{VIS}$, is defined as:

$$R_{VIS}[\%] = 100 \cdot \frac{\int_{380}^{770} R(\lambda) V(\lambda) S(\lambda) d\lambda}{\int_{380}^{770} V(\lambda) S(\lambda) d\lambda} \quad (2)$$

Also, the following indicate:
R(λ): spectral reflection at wavelength λ,
V(λ): spectral light sensitivity of the human eye,
S(λ): spectral radiation function of the type of light used, such as for example the distribution according to standard light D65 according to DIN 5033.

In FIG. 1 the essential design of a known liquid crystal display is depicted. Starting from the viewing environment U from which the display is viewed, a substrate 1 is provided which is transparent. It comprises, for example, glass. The liquid crystal layer 2 and a substrate 3 follow. Between liquid crystal 2 and rear substrate 3 an electrode layer 4 is provided which is electrically conductive. As is known to one skilled in the art, substrate 3 and electrode 4 can be transparent or absorbent, depending on the intended purpose of the display and its installation.

Between the liquid crystal 2 and the front substrate 1 a front electrode arrangement 5 is provided which is transparent and of course electrically conductive, and is structured depending on the pattern to be controlled and displayed on the display.

The structured electrode configuration of layer 5 can comprise, for example, indium tin oxide ITO. Since the use of this material is preferred and conventional, in the following and also in the specification of the invention a structured front electrode comprising this material is assumed.

During the transition from substrate 1 to the liquid crystal 2, consequently, two different regions result along the display which reflect light differently, namely:

$B_o$: regions without electrode layer 5, in which only the interface substrate 1/liquid crystal 2 contributes to the reflection.

Since here the refractive values averaged over the visible spectral range of substrate material and liquid crystal material differ only slightly, the following apply for example:

| Substrate: | $n_{SUB}$: | appr. 1.52 |
|---|---|---|
| Liquid crystal: | $n_{LC}$: | appr. 1.5 |
| and consequently: | | $R_{VIS,o}$ 0. |

$B_f$: in the second region where the interfaces of substrate 1/electrode layer 5 as well as electrode layer 5/liquid crystal 2 contribute to the reflection.

If the averaged refractive value in the visible spectral range of the electrode materials is denoted by $n_{ITO}$, it is evident when considering $n_{SUB}$: appr. 1.52
$n_{LC}$: appr. 1.5
$n_{ITO}$: appr. 1.9 that due to the large refractive value differences existing at this interface, considerable reflections are generated which depend on the thickness of the electrode layer 5.

In the following the reflection difference Δ R in regions $B_o$ and $B_f$ which manifests itself as a difference in brightness, is defined as follows:

$$\Delta R = |R_{VIS,f} - R_{VIS,o}|$$

Apart from the resulting differences of reflections Δ R, the observer of a liquid crystal display also perceives a color difference at regions $B_f$ and $B_o$, which is caused by different reflection spectra R(λ) with and without electrode layer 5, corresponding to $R_f(\lambda)$ and $R_o(\lambda)$. These color differences can be expressed for example in CIE color coordinate values according to DIN standard 5033, July 1970. In particular with liquid crystal displays, in the following referred to as LCD, which have a black background, said optical differences at regions $B_f$ and $B_o$ are strongly noticeable. Consequently, the display structure to be displayed under control is visible even if it is not activated, and it is understood that this can lead to reading errors.

In the following TABLE 1 $R_{VIS,f}$ and $R_{VIS,o}$ values are depicted when using an ITO electrode layer 5, as well as the R values and the particular x, y . . . CIE color coordinate values.

FIG. 2 shows for this known system at a layer thickness of the electrode structure 5 comprising ITO of 25 nm, the reflection spectra $R_f(\lambda)$ and $R_o(\lambda)$ in the visible spectral range.

TABLE 1

Reflections with ($R_{VIS,1}$) and without ITO layer ($R_{VIS,0}$);
ΔR = | $R_{VIS,1}$ − $R_{VIS,0}$ | ; x, y, . . . CIE color coordinates:

| d (ITO) Nm | $R_{VIS,0}$ % | x | y | $R_{VIS,1}$ % | x | y | ΔR % |
|---|---|---|---|---|---|---|---|
| 15 | 0.00 | .31 | .33 | 0.45 | .22 | .22 | 0.45 |
| 25 | 0.00 | .31 | .33 | 1.16 | .22 | .23 | 1.16 |
| 50 | 0.00 | .31 | .33 | 3.28 | .24 | .25 | 3.28 |
| 75 | 0.00 | .31 | .33 | 4.10 | .28 | .31 | 4.10 |
| 100 | 0.00 | .31 | .33 | 2.95 | .38 | .43 | 2.95 |
| 125 | 0.00 | .31 | .33 | 1.02 | .43 | .34 | 1.02 |

SUMMARY OF THE INVENTION

The present invention is based on the task of eliminating in a liquid crystal display of the initially stated type, and described by example in conjunction with FIGS. 1 and 2, the stated disadvantages with respect to region-specific reflection α R and region-specific reflection spectra, and to do so with economically realizable procedures.

This is realized by the implementation of the liquid crystal display, according to the invention, of the stated type according to the features of the invention and its various embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following the invention will be described by example in conjunction with the drawings in which.

DESCRIPTION OF THE PREFERRED EMBODIMENTS

Figure 1:
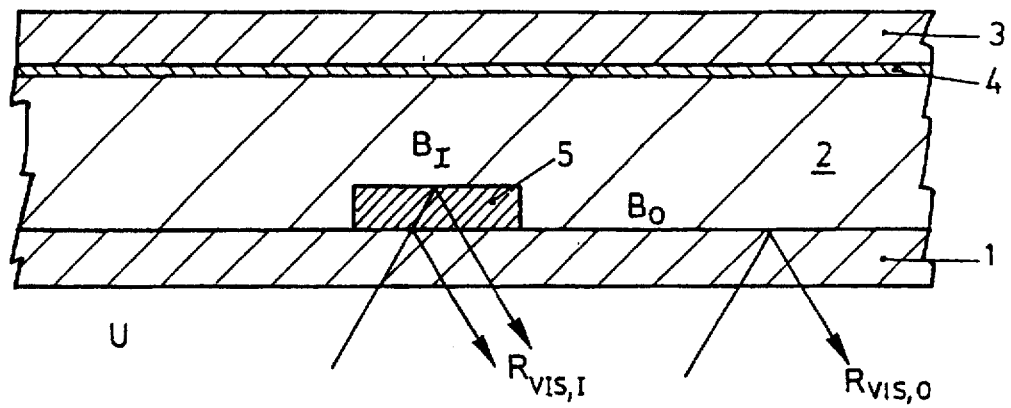
FIG. 1 is the already described structure of a known liquid crystal display.
Figure 2:
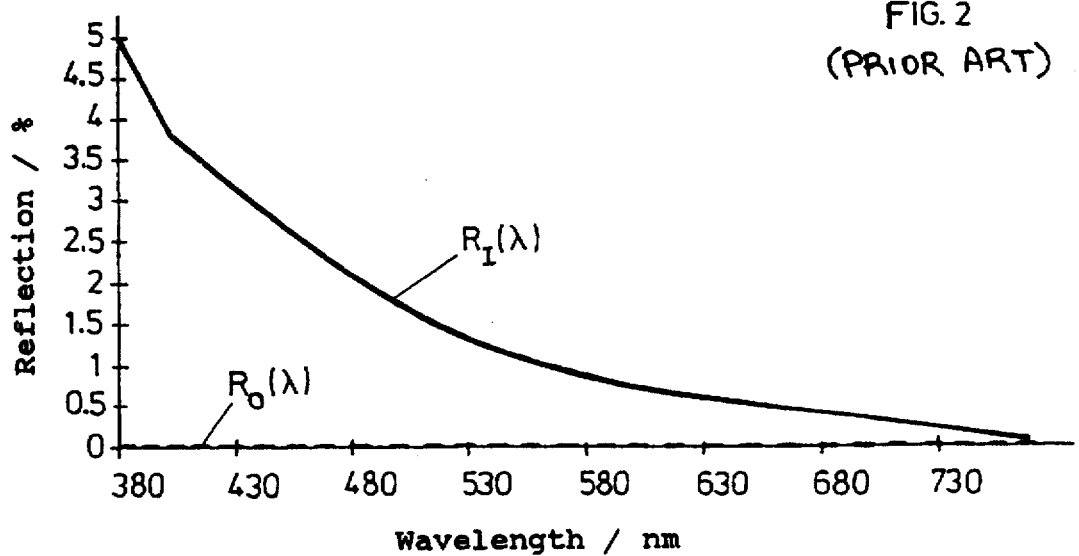
FIG. 2 is the spectral reflection graph at the two regions $B_I$ and $B_o$ of the liquid crystal display according to FIG. 1.
Figure 3:
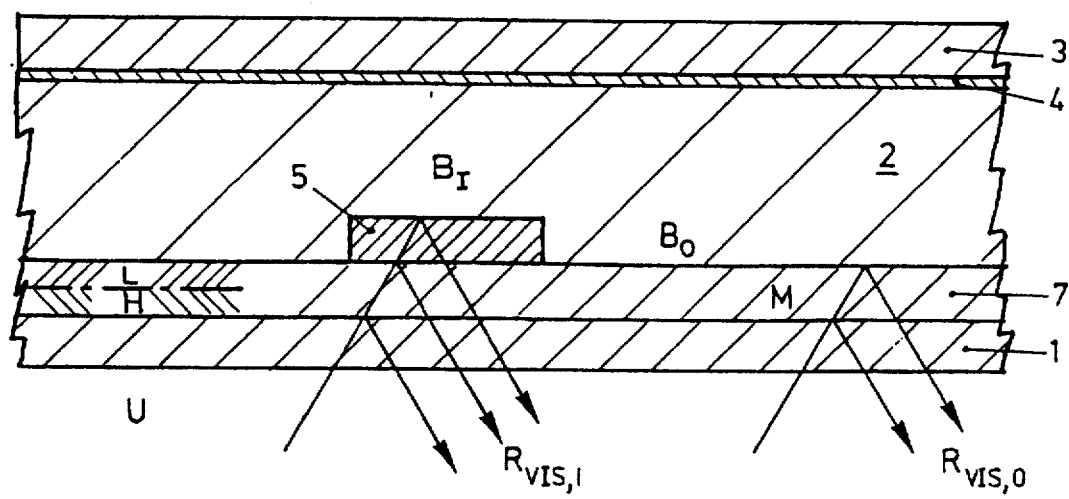
FIG. 3 is a representation, analogous to that of FIG. 1, of a first preferred embodiment a liquid crystal display according to the invention, in two subvariants.

In FIG. 3, in which for elements identical to those in FIG. 1, identical reference symbols are used, and which depicts a preferred embodiment of the present invention, a compensating or matching layer 7 is provided according to the invention between substrate 1 and the conductive electrode layer structure 5.

In a first form of the liquid crystal display depicted in FIG. 3, the compensating layer configuration 7 comprises a single layer M. Depending on the material and layer thickness of the electrode layer structure 5, which thickness is a function of the desired electrical surface resistance, refractive values and physical thickness of the single layer M are optimized so that the reflection differences $\Delta R$ are approximately zero.

In TABLE 2 the results are summarized for ITO as the material of the electrode layer structure 5, with $n_{380\ nm} \approx 2$
$n_{550\ nm} \approx 1.85$
$n_{770\ nm} \approx 1.7$ and the mean substrate refractive value $n_{SUB} \approx 1.52$ as well as the mean liquid crystal refractive value $n_{LC} \approx 1.5$ as a function of the desired thickness d(ITO) of the electrode layer 5, the optimized thicknesses of the compensating layer M, with the resulting mean reflections $R_{VIS,I}$, $R_{VIS,o}$ and the CIE color coordinate values.

Reflections with ($R_{VIS,I}$) and without ITO layer ($R_{VIS,O}$);
$\Delta R = |R_{VIS,I} - R_{VIS,O}|$; x, y ... CIE color coordinates:

| d(M) nm | n(M) | λ/4 nm | d (ITO) nm | $R_{VIS,O}$ % | x | y | $R_{VIS,I}$ % | x | y | ΔR % |
|---|---|---|---|---|---|---|---|---|---|---|
| 87 | 1.66 | 575 | 25 | 0.90 | .33 | .35 | 0.90 | .32 | .31 | 0.00 |
| 66 | 1.72 | 455 | 50 | 1.38 | .29 | .31 | 1.35 | .32 | .31 | 0.03 |
| 58 | 1.72 | 400 | 75 | 1.38 | .29 | .31 | 1.35 | .32 | .31 | 0.03 |
| 61 | 1.67 | 410 | 100 | 0.87 | .29 | .31 | 0.80 | .31 | .31 | 0.02 |
| 79 | 1.65 | 520 | 125 | 0.75 | .31 | .34 | 0.77 | .31 | .35 | 0.02 |

In a preferred variant the single compensating layer M comprises SiON which is deposited by means of reactive DC magnetron sputtering of silicon reactively in an oxygen/nitrogen gas atmosphere. The ITO layer is therein produced immediately following by means of DC magnetron sputtering of ITO. For this purpose preferably a production process or a production arrangement according to U.S. application Ser. No. 08/300,865 is used.

In a second example or subvariant of the preferred liquid crystal display according to the invention depicted in FIG. 3 the compensating layer configuration 7 comprises a multiple, preferably a double layer H and L so that, as indicated in dashed lines on the left side of FIG. 3, the sequence substrate 1/layer H/layer L/liquid crystal 2 or ITO electrode layer/liquid crystal 2, results. Depending on the desired thickness of the conducting electrode layer structure 5, specifically comprising ITO, again refractive values and thickness on the double layer HL are optimized in order to realize at least approximated $\Delta R = 0$.

TABLE 3

Reflections with ($R_{VIS,I}$) and without ITO layer ($R_{VIS,O}$);
$\Delta R = |R_{VIS,I} - R_{VIS,O}|$; x, y ... CIE color coordinates:

| d(H) nm | n(H) | d(L) nm | d(ITO) nm | $R_{VIS,O}$ % | x | y | $R_{VIS,I}$ % | x | y | ΔR % |
|---|---|---|---|---|---|---|---|---|---|---|
| 8 | 2.28 | 40 | 25 | 0.66 | .26 | .28 | 0.64 | .32 | .33 | 0.02 |
| 13 | 2.20 | 29 | 50 | 1.37 | .27 | .28 | 1.36 | .32 | .32 | 0.01 |

TABLE 3 depicts data for two selected thicknesses d(ITO) of the electrode layer structure 5 and for ITO as electrode layer material with the above listed values for the spectral refractive reference supporting values as well as the above listed average refractive values for the substrate and the liquid crystal material. The optimized thicknesses d and refractive values n of layers H and L, with the results with respect to the average reflections are also disclosed. These refractive values n can be realized for example with $TiO_2$ or $Ta_2O_5$.

Figure 4:
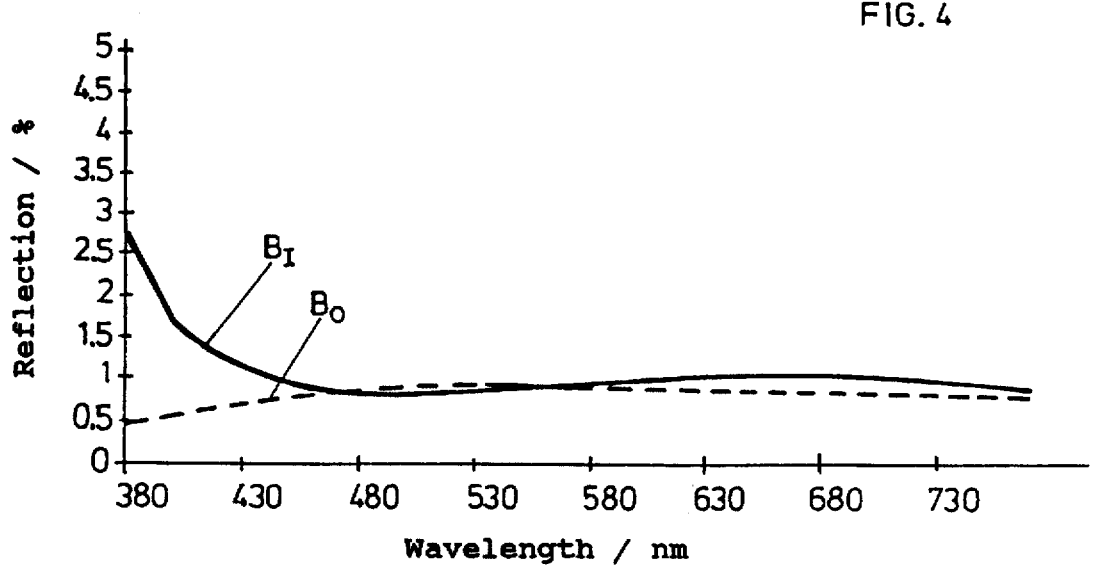
FIG. 4 is a graph similar to FIG. 2 of the profile of the spectral reflections in the regions $B_I$ and $B_o$ of one of the subvariants depicted in FIG. 3.
Figure 5:
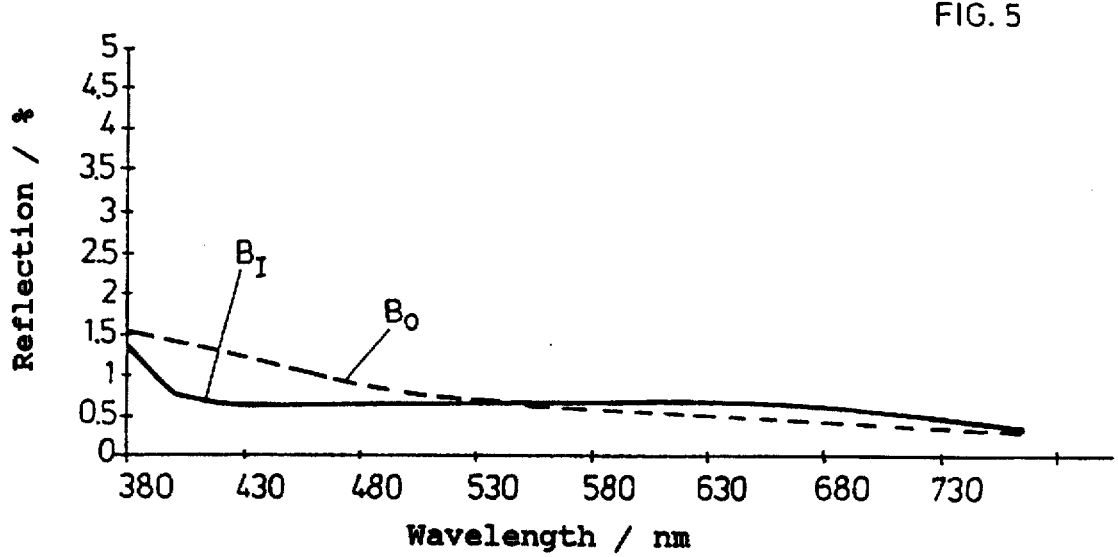
FIG. 5 is a graph like FIG. 4 of the other subvariant.

FIG. 4 depicts the results for a layer thickness d(M) for the single compensating layer M according to FIG. 3 of 25 nm. The resulting curve of $R(\lambda)$ in the regions $B_I$ and $B_o$, is shown in the same type of representation as in FIG. 5 for the embodiment variant according to FIG. 3 with a compensating double layer comprising an H and L layer. In that case wherein here the layer thickness of the H layer is 8 nm and of the L layer is 40 nm. Furthermore the layer thickness of the electrode structure layer 5 comprising ITO is 25 nm.

Figure 6:
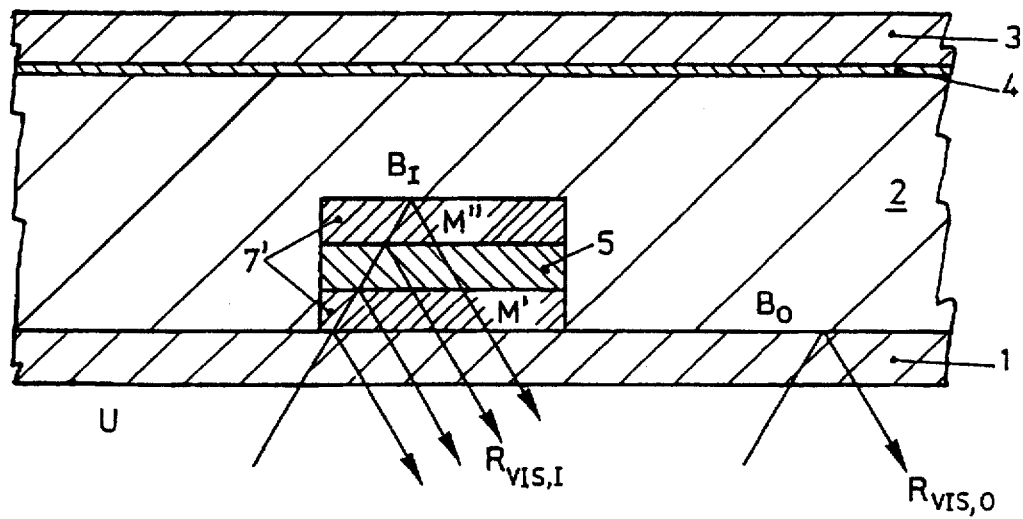
FIG. 6 is a representation analogous to FIGS. 1 and 3 of a further embodiment of a liquid crystal display according to the invention.

In FIG. 6, using identical reference symbols, a further embodiment of a liquid crystal display according to the invention is shown. As is readily apparent, the compensating layer configuration 7' comprises at least one single or at least double layer, on the side of the viewing environment and on the side of the liquid crystal, over the structured or patterned electrode layer 5. Consequently, the conductive electrode structure 5 is embedded in the compensating layer configuration 7', which is structured together with the electrode layer 5.

In a subvariant the two compensating layer configurations 7' each comprise a single layer M' or M". For the above given spectral refractive values at 380, 550 and 770 nm of the ITO material of the electrode layer 5 as well as the listed average refractive values for substrate 1 and liquid crystal 2, the optimized results are listed in TABLE 4 as a function of the ITO layer thickness.

TABLE 4

Reflections with ($R_{VIS,I}$) and without ITO layer ($R_{VIS,O}$):
$\Delta R = |R_{VIS,I} - R_{VIS,O}|; x, y \ldots$ CIE color coordinates:

| d(M')<br>nm | d(ITO)<br>nm | d(M")<br>nm | n(M) | $R_{VIS,O}$<br>% | $R_{VIS,I}$<br>% | $\Delta R$<br>% |
|---|---|---|---|---|---|---|
| 88 | 25 | 88 | 1.68 | 0.00 | 0.01 | 0.01 |
| 72 | 50 | 72 | 1.72 | 0.00 | 0.01 | 0.01 |
| 64 | 75 | 64 | 1.71 | 0.00 | 0.01 | 0.01 |
| 65 | 100 | 62 | 1.67 | 0.00 | 0.01 | 0.01 |

M' and M" denote the two embedded compensating layers according to FIG. 6 which comprise the same material (M). It is understood that the material of the two single layers M', M" in the optimized sense can also be different.

In a further subvariant of the embodiment according to FIG. 6 both compensating layer configurations 7' comprise each a double layer H' and L', or H" and L". With the average refractive values for the L layers $n_L=1.47$, the above given spectral refractive values at 380, 550 and 770 nm for the ITO electrode layer 5 as well as the listed average refractive values for substrate 1 and for liquid crystal 2 give the results shown in TABLE 5.

TABLE 5

Reflections with ($R_{VIS,I}$) and without ITO layer ($R_{VIS,O}$):
$\Delta R = |R_{VIS,I} - R_{VIS,O}|; x, y \ldots$ CIE color coordinates:

| d(H')<br>nm | d(L')<br>nm | d(ITO)<br>nm | d(L")<br>nm | d(H")<br>nm | n(H) | $R_{VIS,O}$<br>% | $R_{VIS,I}$<br>% | $\Delta R$<br>% |
|---|---|---|---|---|---|---|---|---|
| 10 | 48 | 25 | 45 | 10 | 2.06 | 0.00 | 0.01 | 0.01 |

Figure 7:
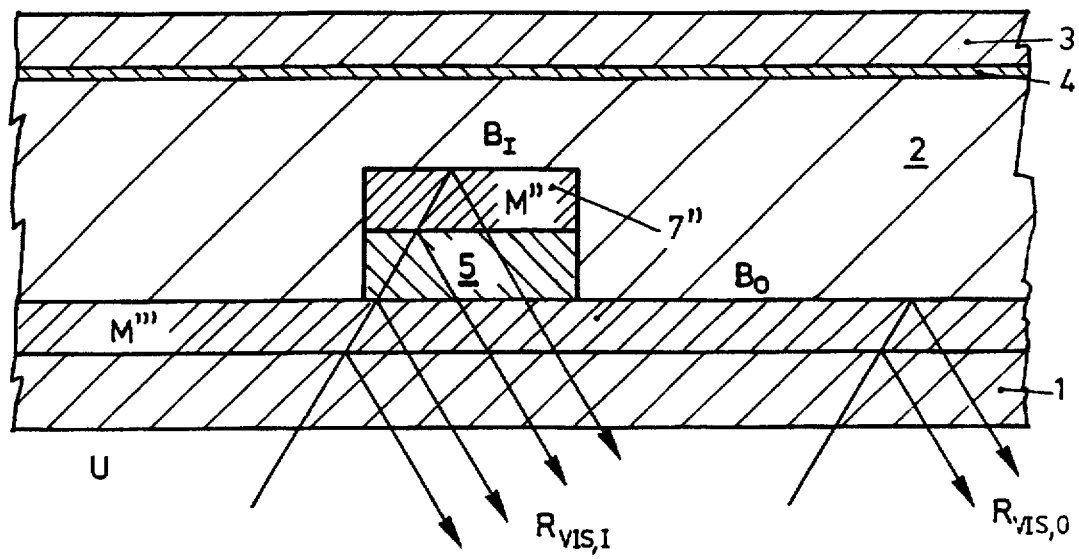
FIG. 7 is a third embodiment variant of a liquid crystal display according to the invention in a representation analogous to FIGS. 1, 3, 6.

In the embodiment according to FIG. 7 the compensating layer configuration 7" comprises a continuous layer M'", preferably implemented as a single layer, as well as layer M" in analogy to the embodiment of FIG. 6, where the materials of the two layers M'" and M" are preferably different. A subvariant of this embodiment is also possible in that the two compensating layer configurations 7" are each realized so as to comprise H and L layers.

The following features of the invention are disclosed:

On the display according to the invention the $\Delta R$ values are smaller than or equal to 0.5%. They are preferably even smaller than 0.2% or even smaller than 0.1%.

In a first embodiment the compensating layer configuration comprises a single layer or single layers disposed on both sides of the electrode structure, whose material preferably has a refractive value following $1.6 \leq n_M \leq 1.8$ averaged in the visible spectral range.

Although it is known to dispose diffusion blocking or barrier layers between the substrate facing the environment and the liquid crystal whose thickness is conventionally approximately 40 nm, such layers which are used as diffusion barriers are not optimized in the scope of the present invention. The compensating layer system according to the invention, on the other hand, optimized according to the invention, acts simultaneously as a diffusion barrier.

In case the compensating layer configuration is implemented with a single layer the latter's thickness $d_M$ is preferably selected according to $50 \text{ nm} \leq d_M \leq 100 \text{ nm}$.

Further, such single layer preferably comprises at least substantially or essentially SiON, $Al_2O_3$ or AlON or a mixed oxide or mixed oxinitrides, at least two metals, preferably at least two materials of the group $SiO_2$, $Al_2O_3$, $Ta_2O_5$, $TiO_2$, $ZrO_2$, $HfO_2$, $Nb_2O_5$.

In a further embodiment the compensating layer configuration comprises at least two double layers, each comprising at least a low-refractive and a high-refractive layer. For the average refractive value of the high-refractive layer is preferably selected $n_H \geq 2$ and for its thickness preferably $d_H \leq 20 \text{ nm}$, therein preferably $5 \text{ nm} \leq d_H \leq 15 \text{ nm}$.

For the layer with the lower refractive index (... the lower refractive layer ...) preferably an average refractive value is selected according to $n_L \leq 1.7$, therein preferably according to $1.35 \leq n_L \leq 1.55$.

For the higher refractive layer, advantageously $TiO_2$, $Ta_2O_5$, $HfO_2$, $ZrO_2$, $Nb_2O_5$ or an oxinitride of the stated metals or a mixed oxide or mixed oxinitrides is used of at least two metals, preferably from at least two materials of the group $SiO_2$, $Al_2O_3$, $Ta_2O_5$, $TiO_2$, $ZrO_2$, $HfO_2$, $NbO_5$.

For the low refractive layer, preferably silicon oxinitride or a mixed oxinitride of at least two metals.

Furthermore, on the display according to the invention the color coordinate values according to DIN standard 5033, July, 1970, differ maximally by 0.06, preferably by less than 0.04.

While specific embodiments of the invention have been shown and described in detail to illustrate the application of the principles of the invention, it will be understood that the invention may be embodied otherwise without departing from such principles.

What is claimed is:

1. A liquid crystal display comprising:

a liquid crystal arrangement;

a first electrically conductive electrode arrangement along one side of said liquid crystal arrangement, the liquid crystal arrangement having another side;

a second patterned, electrically conductive electrode arrangement, having one side facing toward the other side of said liquid crystal arrangement, the second electrode arrangement having another side facing away from said liquid crystal arrangement, said second electrode arrangement having a pattern defining first areas of said display which are provided with said second electrode arrangement and second areas of said display which are without said second electrode arrangement;

a matching layer system at least along one side of said second electrode arrangement and comprising at least one layer predominantly consisting of SION; and said matching layer system providing for a difference of reflection $\Delta R$:

$\Delta R = |R_{VIS,I}[\%] - R_{VIS,O}[\%]| \leq 0.5\%$, wherein $R_{VIS,1}$ stands for the reflection at said first areas of said display and $R_{VIS,o}$ stands for reflection at said second areas of said display for light impinging from outside onto said liquid crystal display.

2. A liquid crystal display as stated in claim 1, wherein $$\Delta R[\%] \leq 0.2\%.$$

3. A liquid crystal display according to claim 2, wherein $\Delta R[\%] \leq 0.1\%$.

4. A liquid crystal display as stated in claim 1, wherein the matching layer system comprises one single matching layer.

5. A liquid crystal display as stated in claim 4, wherein the thickness of the single matching layer $d_M$ is:

$$50 \text{ nm} \leq d_M \leq 100 \text{ nm}.$$

6. A liquid crystal display as stated in claim 1, wherein the matching layer system comprises at least two layers (L,H) with, as viewed toward said liquid crystal arrangement, a first layer of a higher refractive value $n_H$ averaged in the visible spectral range and subsequently a second layer of lover refractive value $n_L$.

7. A liquid crystal display as stated in claim 6, wherein said second layer is of SiON.

8. A liquid crystal display as stated in claim 6, wherein $$n_H \geq 2$$

and a thickness $d_H$ of said first layer is $$5 \text{ nm} \leq d_H \leq 15 \text{ nm}.$$

9. A liquid crystal display as stated in claim 6, wherein the material of said first layer comprises at least substantially $TiO_2$, $Ta_2O_5$, $HfO_2$, $ZrO_2$, $Nb_2O_5$ or an oxinitride of the listed metals or a mixed oxide or mixed oxinitride of at least two metals.

10. A liquid crystal display as stated in claim 9, wherein said mixed oxide is selected to be at least of two oxides of the group $SiO_2$, $Al_2O_3$, $Ta_2O_5$, $TiO_2$, $ZrO_2$, $HfO_2$, $Nb_2O_5$.

11. A liquid crystal display as stated in claim 1, wherein the electrode arrangement facing a display side of said display comprises ITO.

12. A liquid crystal display as stated in claim 1, wherein color coordinate values of reflected light according to DIN standard 5033, July 1970, differ maximally by 0.06 at said first and second areas.

13. A liquid crystal display as stated in claim 12, wherein the color coordinate values differ by less than 0.04.

14. A liquid crystal display as stated in claim 1, wherein at least said one layer is produced by means of reactive sputtering.

15. A liquid crystal display as stated in claim 1, wherein said matching layer system is simultaneously a diffusion barrier.

16. A liquid crystal display comprising:

a liquid crystal arrangement;

a first electrically conductive electrode arrangement along one side of said liquid crystal arrangement;

a second, patterned, electrically conductive electrode arrangement, one side thereof facing toward another side of said liquid crystal arrangement, the other side of said second electrode arrangement facing away from said liquid crystal arrangement, said second electrode arrangement having a pattern defining first areas of said display provided with said second electrode arrangement and second areas of said display without said second electrode arrangement; and a matching layer system at least along one side of said second electrode arrangement and consisting of a single layer, said single layer being of a material having a refractive value $n_M$, averaged in the visible spectral range, of its material of $$1.6 < n_M < 1.8$$

said matching layer system providing for a difference of reflection $\Delta R$:

$$\Delta R = |R_{VIS,1}[\%] - R_{VIS,o}[\%]| \leq 0.5\%,$$

wherein $R_{VIS,1}$ stands for the reflection of said first areas of said display and $R_{VIS,o}$ stands for the reflection at said second areas of said display for light impinging from outside onto said liquid crystal display.

17. A liquid crystal display as stated in claim 16, wherein $\Delta R[\%] \leq 0.2\%$.

18. The liquid crystal display according to claim 17, wherein $\Delta R[\%]' \leq 0.1\%$.

19. A liquid crystal display as stated in claim 16, wherein the thickness $d_M$ of the single matching layer is:

$$50 \text{ nm} < d_M < 100 \text{ nm}.$$

20. The liquid crystal display as stated in claim 16, wherein said matching layer consists at least predominantly of SiON, $Al_2O_3$ or AlON or of a mixed oxide or mixed oxinitrides of at least two metals.

21. The liquid crystal display of claim 16, wherein said matching layer consists of mixed oxide selected from at least two of the materials of the group $SiO_2$, $Al_2O_3$, $Ta_2O_5$, $ZrO_2$, $HfO_2$, $NB_2O_5$.

22. The liquid crystal display according to claim 16, wherein the electrode arrangement facing the display side of said display comprises ITO.

23. The liquid crystal display as stated in claim 16, wherein colour coordinate values of the reflected light according to DIN standard 5033, July 1970, differ maximally by 0.06 at said first and second areas.

24. The liquid crystal display according to claim 23, wherein the colour coordinate values differ by less than 0.04.

25. The liquid crystal display of claim 16, wherein said layer is produced by means of reactive sputtering.

26. The liquid crystal display of claim 16, wherein said layer is a diffusion barrier.

* * * * *

UNITED STATES PATENT AND TRADEMARK OFFICE
CERTIFICATE OF CORRECTION

PATENT NO. : 5,684,554
DATED : November 4, 1997
INVENTOR(S) : Reinhard Sperger, et al It is certified that error appears in the above-identified patent and that said Letters Patent is hereby corrected as shown below:

Title page, Assignee:
Item [73]: change "Germany" to --Liechtenstein--

Signed and Sealed this

Tenth Day of February, 1998

Attest:

BRUCE LEHMAN

Attesting Officer  Commissioner of Patents and Trademarks